July 20, 1965   J. F. POFIT   3,195,560
TOP ENTRY BALL VALVE
Filed Oct. 16, 1961   2 Sheets-Sheet 1

*INVENTOR*
JOSEPH F. POFIT
BY
Williams, Tilbury & Golrick
ATTORNEYS

July 20, 1965  J. F. POFIT  3,195,560
TOP ENTRY BALL VALVE
Filed Oct. 16, 1961  2 Sheets-Sheet 2
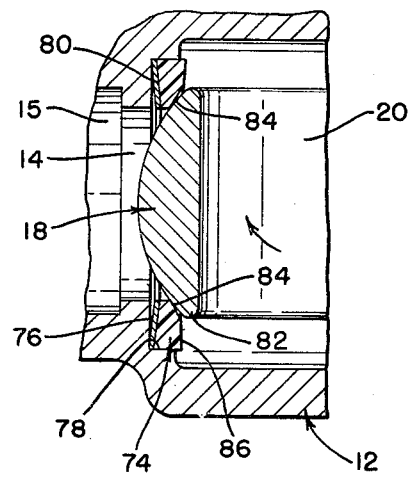
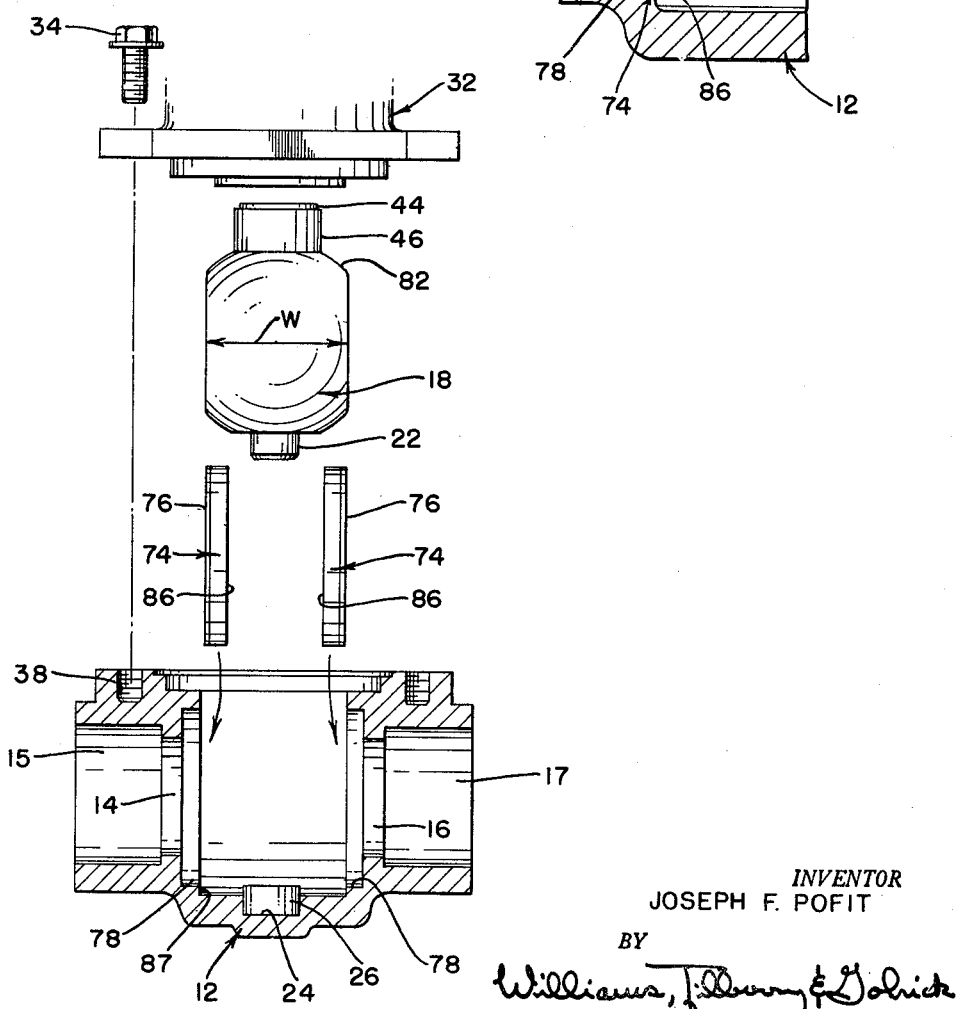
INVENTOR
JOSEPH F. POFIT
BY
Williams, ...
ATTORNEYS United States Patent Office 3,195,560
Patented July 20, 1965

3,195,560
TOP ENTRY BALL VALVE
Joseph F. Pofit, Worcester, Mass., assignor, by mesne assignments, to E. W. Bliss Company, Canton, Ohio, a corporation of Delaware
Filed Oct. 16, 1961, Ser. No. 145,305
2 Claims. (Cl. 137—315)

This invention relates to valves, and more particularly, to a novel ball valve having a removable top housing to permit access into the interior of the valve. Such a valve may be generally referred to as a top entry ball valve.

While this invention is not necessarily limited thereto, it is primarily concerned with ball valves of the type in which a generally spherical valve member having a diametrically extending bore is rotatably mounted on valve seats in a valve body. The spherical valve member has inlet and outlet passages whereby the valve may be rotated, relative to the body, between an open position wherein the bore in the valve member is in registry with the inlet and oulet passages in the body, and a closed position wherein the valve member bore is out of registry with the passages in the body to prevent flow to the valve.

Top entry valves have received wide acceptance, because such valves may have certain repairs made to them without removing them from the fluid conduits leading to and from the valves. Top entry valves of the gate type, for example, are known.

Attempts to manufacture top entry ball valves have been generally complicated because the ball or spherical valve member and the seats were intended to be inserted into the valve body simultaneously. Considerable force had to be applied to the valve member and seats which invariably resulted in damage to the seats. The damage occurred because the seats, being composed of materials considerably softer than either the valve body or spherical valve member, were wedged in between the valve body and the spherical member as force was applied to insert the seats and the valve member into the valve body. The damage to the seats, in the form of scratches and abnormal deformation of the seat, resulted in improper sealing between the valve member and the seat and causing leakage.

It is a primary object of this invention to provide a ball valve of the top entry type in which the spherical valve member may be removed and inserted into the valve body with or without removal of the valve seats.

It is another object of the invention to provide a top entry ball valve which may be repaired while still connected to the fluid conduits leading to and from the valve.

It is a further object to provide a ball valve of the top entry type in which the spherical valve member and the valve seats may be removed, and reinserted into, the valve body while the valve is connected to the lines leading to and from it, and which has means for loading the seats upon reinsertion of the seats into the ball valve.

It is a still further object of the invention to provide a ball valve which may have one or two seats, and may also be provided with the mechanical springs for urging the seats into contact with the spherical valve member.

Other objects and advantages will be apparent to those skilled in the art by reference to the following detailed description, taken in connection with the drawings.

In the drawings:

FIGURE 4 is a fragmentary view similar to FIGURE 3 illustrating the co-action of the spherical valve member and a valve seat in the preferred form of the invention; and FIGURE 5 is an exploded view of some of the elements of the valve of FIGURE 1, illustrating a procedure for assembling the valve from the top.

Figure 1:
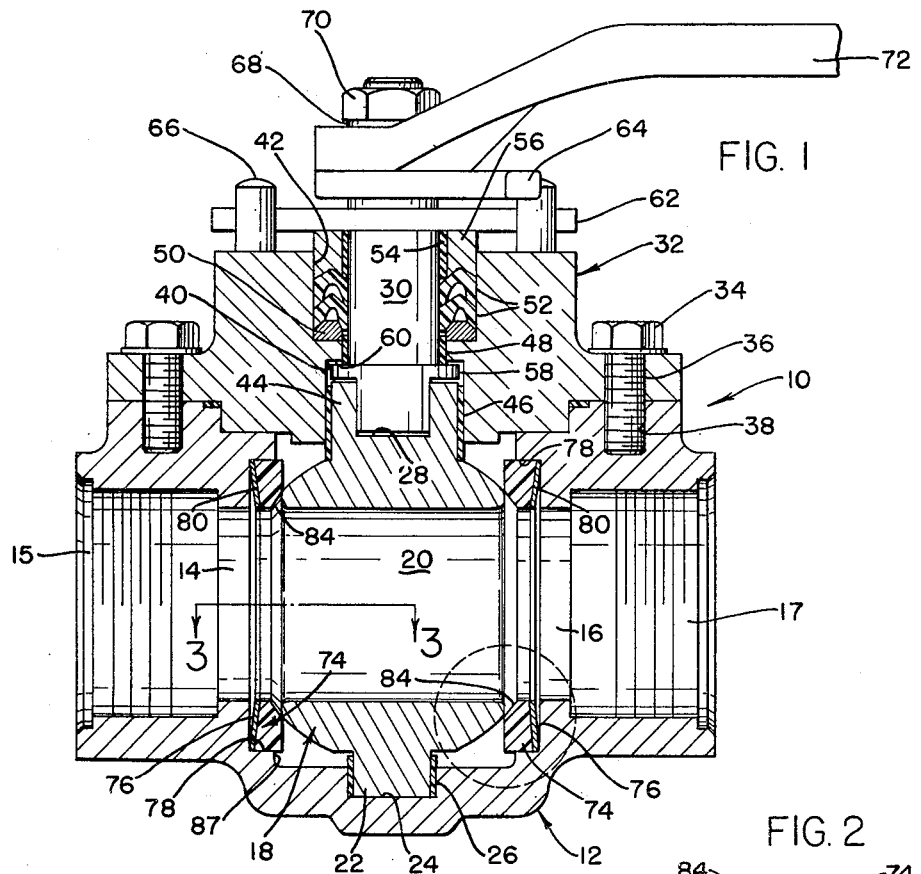
FIGURE 1 is a longitudinal section partially in elevation, illustrating the preferred form of the invention.

Referring now more specifically to FIGURE 1, the valve comprising a preferred embodiment of the invention is generally designated by the numeral 10. The valve comprises a valve body 12, which may be of a unitary construction, or may be formed of two or more parts suitably joined together. The body 12 is provided with coaxially aligned and axially spaced apart fluid passages 14 and 16, internally threaded as indicated at 15 and 17 in order to receive externally threaded ends of fluid conduits which may be secured to these passages. Disposed within the body 12 is a rotatable valve member 18 which has a generally spherical shape, and is provided with a bore 20 which extends diametrically therethrough. The bore 20 is coaxially alignable with passages 14 and 16 to permit fluid flow through the valve. Valve member 18 is seated within the body 12 by means of a trunnion 22 formed at the lower end of the valve member, and which is suitably journaled in socket 24. A bushing assembly 26 may also be provided to insure smooth operation of trunnion 22 in socket 24. A socket 28 is also formed in the periphery of the ball and extends radially inwardly of the ball, normal to the bore 20.

One end of a valve stem 30 is drivingly engaged in the socket 28. A removable cap plate 32 is secured to body 12 by screws 34 passing through holes 36 and 38 formed in the cap plate 32 and housing 12 respectively. Openings 40 and 42 are formed in the cap plate 32 to accommodate a trunnion 44 formed at the upper portion of the ball and the sealing materials placed about the valve stem 30. Upper trunnion bushing 46 is provided to serve as a bearing in a manner similar to bushing 26 associated with lower trunnion 22.

The sealing materials placed between the valve stem 30 and opening 42 in cap plate 32 may include a lower bushing 48 and an upper bushing 54 fitted about the valve stem 30, a lower adapter 50, Chevron packing rings 52, and an upper adapter 56. A thrust washer (not shown) may also be utilized between the flange 58 of valve stem 30 and lip 60 formed by the opening 40 of cap plate 32. It should be understood that the type and quantity of sealing material utilized between the valve stem 30 and opening 42 may be varied according to the nature of the materials utilized in manufacturing the valve body, and the applications intended for the valve.

Fitted about the upper end of valve stem 30 is a compression plate 62 which engages the upper surface of bushing 56. Compression plate 62 is secured to the top of cap plate 32 by means of screws (not shown). Also secured to the upper end of valve stem 30 is a handle 72 and a stop plate 64. Fitted about the threaded upper extremity of valve stem 30 is a jam nut 70 for the purpose of firmly securing handle 72, stop plate 64 to the valve stem 30. A washer 68 may be interposed between the jam nut 70 and the handle 72 if desired. The stop plate 64 is adapted to rotate with handle 72 to describe an arc limited at either end by stop pins 66. Stop pins 66 are useful in indicating to the operator when the valve is fully open and when it is fully closed, i.e., when bore 20 is aligned and when it is not aligned with passages 14 and 16. The compression plate serves the purpose of maintaining the bushings and the associated sealing materials in close contact with the cap plate 32 and the valve stem 30 in order to prevent undesirable leakage between these parts.

Figure 2:
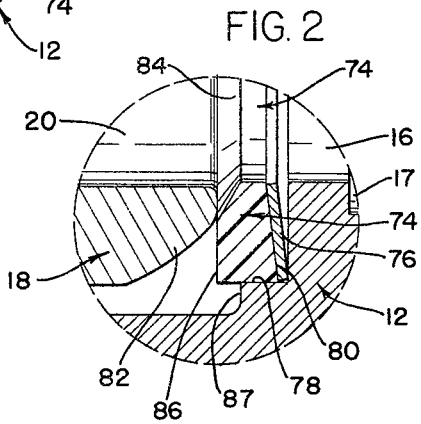
FIGURE 2 is an enlarged fragmentary view of the encircled area of Figure 1.
Figure 3:
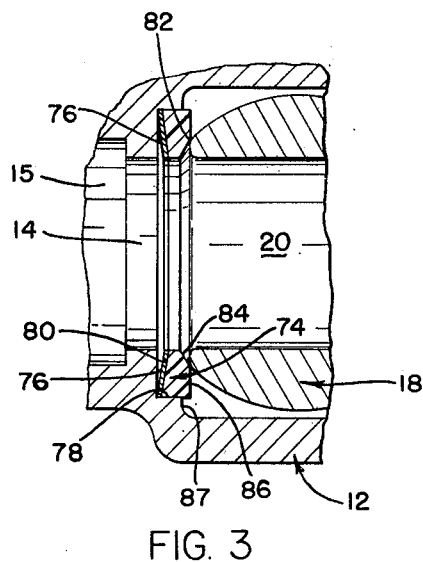
FIGURE 3 is a fragmentary sectional view taken on line 3—3 of FIGURE 1.

As shown in FIGURE 1, annular shoulders 78 are formed in body 12. Fitted within each of the shoulders 78 is a valve seat 74, which may be made of any of the common materials utilized for valve seats, such as Teflon and nylon, and an annular mechanical spring 76. The spring 76 is disposed between the body 12 and the seat 74, and is preferably dimensioned so that it is substantially co-extensive and in mating engagement with the seats. If a Belleville spring is utilized, a surface 80 (FIGURES 2–3) of the seat which faces the adjacent wall of the valve body should be formed with a conical depression to provide a good mating surface for the frustoconical surface of the Belleville spring. As shown in FIGURE 1, the valve may comprise two seat assemblies, that is, the valve may be double seated, and a spring, such as the Belleville spring may be utilized with one or both of the valve seat assemblies. Double seated as used here refers to the use of two valve seats, one at the inlet orifice and one at the outlet orifice as illustrated in FIGURE 1. A single seated valve would utilize only one seat, located generally at the outlet side of the valve. The surface of the seat may be bevelled, or in the form of a spherical section, as at 84, to accommodate the generally spherical outer surface of valve member 18 for the purpose of obtaining a better sealing relationship between the seat and the valve member.

Referring to FIGURE 5, the structure of this invention which makes possible the top entry feature will be described. The valve body 12 is shown in FIGURE 5 as disassociated from conduits connected to ends 15 and 17 of the body. It should be understood, however, that the procedure for assembling the spherical valve member and the seats within the valve body is the same, whether the valve body is connected to fluid conduits as it would be in ordinary use, or whether it is placed on a workbench prior to assembly of the completed valve. As shown in FIGURE 5, seats 74 are seated within the valve body 12 by dropping them into the valve body and placing them within the annular shoulders 78 provided in the valve body for accommodating the seats. If mechanical springs are utilized in conjunction with the seats, the springs would be located in the annular shoulders before the seats were positioned. The spherical valve member 18 is then inserted in the valve body. It should be noted that the spherical valve member is inserted with the diametrically extending bore 20 in the open position, that is, with the bore to be aligned with the passages 14 and 16. The width of the spherical valve member, shown as W in FIGURE 5, is equal to or slightly less than the distance between opposed faces 86 of valve seats 74. In this manner, spherical valve member may be inserted into the valve body while it accommodates seats 74 without scratching or otherwise damaging the valve seats. Cap plate 32 and the associated sealing elements are then assembled, and the compression plate 62, stop plate 64 and handle 72 are secured to the valve body. The valve seats are properly loaded and placed firmly in position by rotating the valve body 18 to the closed position as shown in FIGURE 4. The lip 82 of the valve member 18 engages the surface 84 of the valve seat and cams the seat into the proper position. The cooperation of lip 82 of the spherical valve member 18 with the surface 84 of the valve seat 74 is best shown in FIGURE 4. It is this camming co-action between the spherical valve member and the seat which firmly positions the seat in the valve, and also permits the width of the spherical valve member to be slightly less than the distance between the opposed faces 86 of the valve seats. The operation of lip 82 and surface 84 of the valve seats 74 is such that even if a spring were present as shown in FIGURE 4, the force applied by this camming co-action is sufficient to load the seat and the spring. When only one seat is utilized, the width W of the spherical valve member would be equal to or less than the distance between the surface 86 of the seat 74 and the opposite wall 87 of the valve body.

It should be understood that the camming co-action between lip 82 and the seat surface 84 is the same whether one seat or two seats are utilized, because the spherical valve member is provided with identical lip surfaces on each of the openings for bore 20.

Many modifications may be made in the above construction, and many apparently widely different embodiments of this invention may be made without departing from the scope and spirit thereof, and it is intended that all matter contained in the above description or shown in the accompanying drawings shall be interpreted as illustrative and not in a limiting sense.

What is claimed is:

1. A top entry ball valve having a flow passage and being adapted to be secured in a fluid line to permit regulated fluid flow therethrough comprising a valve body having coaxially aligned and axially spaced apart annular shoulders formed circumjacent the valve passage, each said shoulder having a radially extending flat surface facing inwardly;

a cap removably secured to the valve body providing access to the interior thereof midway between said flat surfaces;

an annular valve seat formed of a flexible but relatively incompressible material removably fitted within each shoulder and having a frustoconical surface facing said flat surface and defining therewith a space for relative axial movement of said valve seat;

an annular spring member having a frustoconical surface in mating engagement with the frustoconical surface of each said valve seat; and a rotatable spherical valve member removably disposed within said valve body and having a bore therethrough coaxially aligned with said valve seats in a full flow open position, said spherical valve member having a longitudinal dimension through the bore not greater than the distance between the opposed valve seating surfaces with the seats in an installed position and having a lateral dimension exceeding such distance whereby upon rotation of the spherical valve member from the full flow open position the frustoconical surface of each valve seat is cammed axially outwardly against the biasing force of said spring members.

2. A top entry ball valve as set forth in claim 1 wherein said valve seats are formed of a plastic material.

References Cited by the Examiner

UNITED STATES PATENTS

| | | | |
|---|---|---|---|
| 2,373,628 | 4/45 | Gleeson | 251—315 |
| 2,932,311 | 4/60 | Scherer | 251—315 XR |
| 2,942,840 | 6/60 | Clade | 251—315 XR |
| 3,045,693 | 7/62 | Allen | 137—315 |
| 3,067,978 | 12/62 | Natho | 251—315 XR |

FOREIGN PATENTS 166,481  1921  Great Britain.

ISADOR WEIL, *Primary Examiner.*